United States Patent Office 2,813,028
Patented Nov. 12, 1957

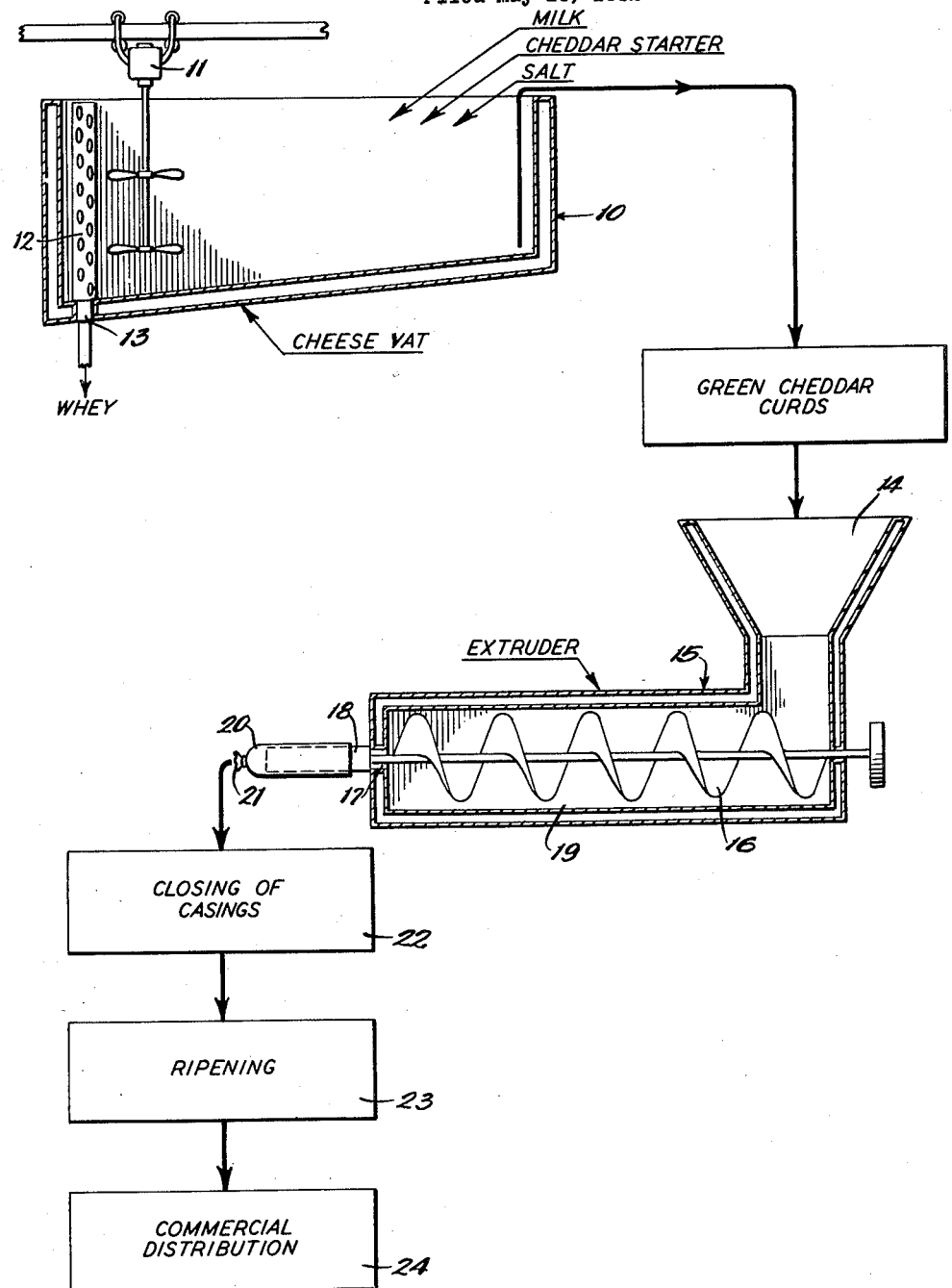

2,813,028

PROCESSING OF CHEDDAR CHEESE

Howard C. Jackson, Jr., Oak Lawn, Ill., assignor to Armour and Company, Chicago, Ill., a corporation of Illinois Application May 16, 1952, Serial No. 288,256

4 Claims. (Cl. 99—115)

This invention relates to the processing of Cheddar cheese. More particularly, this invention relates to the processing of green Cheddar curd in the production of Cheddar cheese.

Cheddar cheese is usually pressed into shapes and sizes which are well adapted for handling in transporting and warehousing operations; these shapes and sizes are not so convenient for retail sales. The large cylindrical shapes are covered with paraffin and cloth bandages which cannot be easily removed by the retail merchants. Some of these problems are: the sampling of cheese by clerks and prospective customers, the drying of the cheese between sales, and the maintenance of strict cleanliness in handling the cheese. The sale of food in packages is so simple and clean that the cheese industry has sought for many years to package cheese for retail distribution.

Early attempts to merchandise cheese in units of more convenient size resulted in the manufacture of smaller styles of cheese. Daisies, Longhorns, Young Americans are common small styles; there are others. In more recent years new methods and materials for packaging cheese have been developed. The most common method of marketing cheese in the size packages desired by customers is to cut the large cheeses after cutting into smaller pieces of the desired weights. These pieces are then wrapped, packaged in boxes, and distributed through commercial channels.

As already indicated, the large sizes of cheese are best adapted for obtaining maximum efficiency in the manufacturing process. The production of consumer size packages from these large cheeses, however, has the disadvantage of requiring the additional steps of cutting and wrapping, without any savings in the required processing steps at earlier points in the process. There is therefore a need for a process for packaging Cheddar cheese in consumer size packages in which packages of the desired size are obtained at an earlier point in the manufacturing process.

It is believed that the process of the present invention can be best understood and the unique value thereof best appreciated by comparing it with the usual process employed to produce Cheddar cheese in commercial size packages. A typical process for producing Cheddar cheese, as practiced in the United States, involves the following steps.

(1) Starting: A batch of milk is charged into a cheese vat and innoculated with Cheddar starter (lactic starter).

(2) Ripening: The milk is ripened until acid is developing at a suitable rate.

(3) Renneting: The curd is set by the addition of rennet when proper acidity is reached.

(4) Cutting: The curd is cut with curd knives into cubes to release the whey when it has reached the desired degree of firmness.

(5) Firming: The curd is stirred and heated to control the expulsion of whey and the development of firmness in the consistency of the curd particles.

(6) Dipping: The stirring is stopped, and, after the curd settles, part of the free whey is removed. When the curd reaches the proper acidity and firmness, the rest of the free whey is removed, which generally includes the step of forming a longitudinal trench through the center of the curd.

(7) Cheddaring: The separated curd piles are allowed to pack into slabs, and then the slabs are cut into blocks. The blocks are turned at intervals, and finally piled, initially being piled two-high and later three-high.

(8) Milling: After the blocks of curd have developed the desired characteristics, they are cut into rectangular pieces with a curd mill.

(9) Stirring: The curd is stirred during and after milling to keep it from matting.

(10) Salting: Salt is incrementally sprinkled on the milled, stirred curd, and the curd is turned between saltings to distribute the salt uniformly.

(11) Hooping: The salted curd is removed from the vat in pails, and dumped into hoops. The large hoops are lined with cloth before the curd is placed in them, but the smaller hoops are generally not lined initially. The hoop linings are carefully arranged to achieve the best possible appearance and smoothest surface in the finished cheese.

(12) Initial pressing: The hoops are placed in a press and subjected to pressure just sufficient to knit the curd pieces together. This generally takes about 30 to 60 minutes.

(13) Dressing: The knitted curd forms in the small hoops are bodily removed, wrapped in cloth, and replaced in the hoops. The completion of the wrapping of the pressed curd in the large hoops, which involves applying cloth sections to the top of the knitted curd forms, is generally carried out without removing the hoops from the press.

(14) Final pressing: The hoops (both large and small) are then subjected to final pressing, which will usually take from 6 to 20 hours to complete the knitting and forming of the green cheese.

(15) Drying: The pressed green cheeses are removed from the hoops, and stored in a drying room until rind is developed. This generally requires about 3 to 4 days.

(16) Paraffining: The cheese is dipped in a bath of milled paraffin to prevent loss of moisture from the surface of the cheese during curing.

(17) Curing: The cheese is stored under appropriate conditions for ripening until the desired flavor, body, texture, color, and appearance are obtained.

(18) Packaging: The cheese is generally prepared for commercial distribution as follows. Smaller styles such as Daisies, Longhorns, Young Americans, are generally boxed and distributed without alteration to retail merchants. The larger styles are frequently cut into smaller pieces and packaged into the size units desired by consumers before distribution to the retailers.

The above sets out in somewhat simplified form the typical process for making the common variety of Cheddar cheese. However, slight modifications of the process are also practiced, although not as extensively, to produce other varieties of Cheddar cheese. One of these modifications is known as the stirred curd or granular process. This variation follows the steps set out above except that the steps of milling and cheddaring are eliminated by stirring the curd substantially continuously during the draining of the whey and until the curd is ready for salting. Another modification is known as the washed curd or soaked curd process. It follows the same procedure as for the common variety of Cheddar cheese, except that the additional step is employed of covering the freshly milled curd with cold water for from 5 to 30 minutes. The wash water is drained from the curd before salting. Still another modification is that of making Colby cheese. Here the process is the same until the time of dipping. At this point in the process part of the whey is removed, and cold water is added to the remaining whey and curd and allowed to remain in the vat for a short period. The whey and water are drained from the curd before salting.

In this specification and the claims appended thereto, the term "Cheddar cheese" is used in its generic sense, as referring to all the common varieties of Cheddar cheese, including specifically the modifications of ordinary Cheddar cheese such as stirred curd, washed curd, and Colby cheese.

Efforts have previously been made to provide improvements in the methods of packaging Cheddar cheese. Uncured Cheddar cheese has been canned. In this process special hoops are filled with curd, the curd is then pressed, dressed, and repressed. Thereafter, the pressing cloth is removed, the loaves are cut into pieces of the desired weight, which are then wrapped in parchment paper and placed in cans. Special valve-vented cans are required to permit normal ripening of the cheese, as well as sealing machines for closing the cans.

Another development in the packaging of Cheddar cheese involves the use of flexible wrappers. According to present practice, these wrappers are generally applied when the cheese has reached its final form during or at the end of the pressing operation. In the packaging of uncured cheese by this procedure, the curd is partially knitted by pressing, and then wrapped in flexible material. The wrapper is then pressed to the curd to obtain tight adhesion of the wrapper to the cheese. The object of this is to discourage mold growth, but this has not proved to be a complete answer to the problem. Merely wrapping the flexible material about the uncured cheese, and pressing the wrapper to the cheese does not produce the desired degree of adhesiveness between the cheese and the wrapper. Subsequent handling of the cheese frequently brings about a separation between the wrapper and the cheese which permits the outer surface of the cheese to be more easily attacked by mold. In fact, visible mold growth is still the chief cause of cheese deterioration in the flexible type of wrappers. To overcome this problem, special precautions are sometimes taken, such as vacuum sealing of the flexible wrappers about the cheese, or sealing in an atmosphere of carbon dioxide. However, such precautions add to the expense of marketing the cheese.

It is therefore a primary object of the present invention to provide a new method of packaging Cheddar cheese in consumer size units which substantially overcomes all of the above problems, and results in greatly increased efficiency in marketing packaged cheese. More specifically, it is an object of this invention to provide a method of processing Cheddar cheese by taking the green Cheddar curd directly from the vat and packaging it in consumer size units without employing the steps of hooping, pressing, etc. Further objects and advantages will appear as the specification proceeds.

In the course of the experimental work leading to the present invention, it was discovered that green Cheddar curd can be taken directly from the vat and extruded into flexible pre-formed wrappers without adversely affecting the ultimate characteristics of the cheese. It was further discovered that when green Cheddar curd is to be extruded into packages, it is preferable that the curd, prior to or simultaneously with the extrusion operation, be subjected to kneading and comminuting to decrease the size of the curd pieces and to increase the homogeneity of the curd mass. The discovery that green curd can be handled in this manner is surprising in view of the general belief that green curd, in either the milled or granular form, must be knitted together by gentle, gradually increasing pressure to cause the plastic curd pieces or particles to slowly flow together. This type of pressing procedure, although it is not the sole factor involved, has been thought vital to the production of Cheddar cheese of the desired texture and body.

In one of its phases, this invention contemplates the taking of green Cheddar curd, after the completion of the vat operations, and placing it in an enclosed chamber. Pressure is then applied to the curd mass sufficient to cause it to be extruded from the chamber through a restricted opening into pre-formed flexible wrappers. After completion of the vat operations, the curd will be in a subdivided state (milled or granular), and the salt will have been distributed uniformly throughout the curd by stirring. The chamber can take the form of a cylinder adapted to receive a piston at one end, and equipped with a discharge orifice at the other end connected to a nozzle through which the green cheese curd is extruded by the movement of the piston in the chamber toward the orifice. The preformed wrappers or envelopes are preferably composed of plastic film formed into elongated casings open at one end. Cylindrical-shaped casings are especially suitable, but other shapes can be satisfactorily employed.

A wide variety of plastic films can be used to form the wrappers, such as cellulose base films (Cellophane), rubber chloride base films (Pliofilm). Polyvinylidene chloride base films (Saran) are especially suitable. It is preferred that the film have the following characteristics:

(1) It should be substantially moistureproof, that is, having a relatively low moisture vapor transmission rate to prevent the development of rind by the drying out of the cheese.

(2) It should be slightly permeable to carbon dioxide under pressure, that is, sufficiently permeable to permit normal curing of the cheese.

(3) It should cling or stick to the cheese to prevent mold growth.

(4) It should be slightly extensible so that the filling of the pre-formed wrappers will cause them to expand slightly, and thus improve the cling between the wrapper and the cheese.

(5) The film should be transparent or translucent to improve the appearance of the package cheese.

Some of the above film characteristics can be dispensed with, while still obtaining a satisfactory product. For example, if the film is too permeable to moisture, the packaged cheese can be dipped in wax. Also, if the film is not sufficiently permeable to carbon dioxide, the ends of the wrappers can be fastened by means providing relief openings through which the gas can escape.

In another phase of this invention, it has been found preferable to knead and comminute the curd prior to or simultaneously with the extrusion to reduce the size of the curd pieces and to increase the homogeneity of the curd mass. Preferably these operations are carried out in an extruder apparatus equipped with a screw for propelling the curd from a hopper to an extrusion die provided with an orifice discharging into an external nozzle. It has been found that curd handled in this manner ripens faster, achieving a smooth bodied texture in a relatively short period of time. It is believed that the mechanical action of kneading and comminuting the curd, and particularly the knitting of the curd, is responsible for the increased rate of ripening.

The steps involved in the process of this inventon are illustrated in the enclosed drawing. At the top there is shown a jacketed cheese vat 10 of the conventional type equipped with mechanical stirring apparatus 11, and having a tubular screen 12 surrounding the whey discharge outlet 13. The milk is charged into vat 10 as indicated, followed by the Cheddar cheese starter. The operations of renneting, cutting, firming, dipping, Cheddaring, milling, and stirring are then carried out. Salt is then introduced as indicated to produce salted, unknitted, green Cheddar curd. The green Cheddar curd is then removed from vat 10 and introduced into the hopper 14 of extruder 15. The curd feeds from hopper 14 onto screw 16 which conveys the curd to orifice 17 which communicates with cylindrical nozzle 18. In the illustration given, extruder 15 is provided with a jacket so that the cheese curd can be heated as it passes through the apparatus. If desired, the extruder can be provided with more than one cooperating screw, and the screws can be made hollow so that they can be heated internally. The screw 16 cooperates with tubular casing 19 in kneading and comminuting the curd as it passes through the chamber provided by casing portion 19.

The curd is extruded through nozzle 18 into preformed wrapper 20. In the illustration given, wrapper 20 is of cylindrical form and has one end tied at 21. At the start of the filling operation, cylindrical casing 20 is pulled over nozzle 18, as illustrated. In actual practice, the extruder is run until a homogeneous mass begins extruding from the nozzle, and then the screw is stopped. The casing is then slipped over the nozzle and pulled all the way up. The extruder is started, and the casing is restrained somewhat, as the curd fills it, and forces it off the tube. The restraint causes the curd to completely fill the casing, while slightly expanding or stretching the casing. After filling the casing as described the open end is twisted slightly to compress the curd and insure good cling between the green cheese curd and casing, and the open end is closed by tying with a string or applying a metal clip. Excess casing material is trimmed off and the casing ends are washed free of curd to prevent molding at these points. The casing is then put in a cooler to cure. The steps closing the casing, ripening the cheese, and distributing the ripened cheese are indicated respectively by the numbers 22, 23, and 24.

The green Cheddar curd at the time it is removed from the cheese vat will ordinarily be at a temperature between about 85 to 90° F. While the green curd can be satisfactorily extruded at temperatures within this range, it is preferred to employ temperatures above 90° F. The optimum temperature conditions for the kneading, comminuting, and extruding steps are between about 85° to 110° F. The overall temperature range within which the extrusion operation can be carried out is from about 65 to 130° F. The use of temperatures within the optimum range (85 to 110° F.) sufficiently softens the green curd so that it can flow under pressure. The kneading, comminuting, and extruding of the cheese curd at these temperatures have not been found to have any harmful effect, although this might have been the expected result. With an extruder of the type shown in the drawing, the heating of the green curd can easily be carried out by introducing steam or hot water in the jacket, or into the interior of the screw if it is of hollow construction.

Substantially the same conditions can be employed for ripening the cheese packaged in accordance with this invention as those previously employed for ripening Cheddar cheese. For example, suitable ripening can be obtained at temperatures from between 33 to 60° F. Preferably, ripening temperatures of 40 to 50° F. are employed. At temperatures within this range a very smooth bodied cheese has been obtained in less than 60 days' storage time. The cheese produced in accordance with this process is of excellent quality, displaying the desirable characteristics of flavor, body, texture, and appearance.

It has been found that mold growth is almost completely prevented by packaging the green cheese curd in accordance with this invention. Mold contamination can be prevented rather easily in the cheese vat and in the extrusion equipment by proper sanitary precautions. Even though some mold spores are picked up by the green Cheddar curd, the extrusion of the green cheese curd into the wrappers under pressure stretches the casing and causes the green cheese curd to cling tightly to the wrapper. The development of carbon dioxide within the casings also helps to inhibit the mold growth, and the tying or gripping of the ends of the casings as described above provides relief openings through which the carbon dioxide can escape without extending the wrapper so that it is unduly separated from the outer surface of the wrapped curd mass.

While in the foregoing specification this invention has been set forth in considerable detail for purpose of illustrating various embodiments thereof, it will be apparent to those skilled in the art that many of the details set forth can be varied widely without departing from the spirit of the invention.

I claim:

1. In a method of making Cheddar cheese wherein there is produced a green Cheddar curd which is subsequently ripened, the steps of introducing said green Cheddar curd into a chamber prior to the ripening step and extruding the curd through an outlet in said chamber, thereby increasing the rate at which said curd ripens, and thereafter ripening the extruded curd in individual preformed flexible containers.

2. The process of claim 1 wherein the green Cheddar curd is kneaded and comminuted prior to extrusion.

3. The process of claim 2 wherein the mass of said green Cheddar curd is maintained at a temperature between about 85 to 110° F. during said kneading and extruding steps.

4. The process of claim 1 wherein said flexible containers are composed of flexible plastic film.

References Cited in the file of this patent

UNITED STATES PATENTS

| | | |
|---|---|---|
| 1,965,618 | Vogt | July 10, 1934 |
| 2,018,637 | Doane | Oct. 22, 1935 |
| 2,065,182 | Harris | Dec. 22, 1936 |
| 2,109,093 | Rossman et al. | Feb. 22, 1938 |
| 2,350,912 | Marshall | June 6, 1944 |
| 2,424,693 | Jones | July 29, 1947 |
| 2,494,636 | Stine | Jan. 17, 1950 |
| 2,520,183 | Toone | Aug. 29, 1950 |
| 2,540,815 | Eldredge | Feb. 6, 1951 |
| 2,607,696 | Kunz | Aug. 19, 1952 |